(12) United States Patent
Mouri

(10) Patent No.: US 12,361,940 B2
(45) Date of Patent: Jul. 15, 2025

(54) MATERIAL TESTING MACHINE AND PARTICLE ANALYZING APPARATUS

(71) Applicant: SHIMADZU CORPORATION, Kyoto (JP)

(72) Inventor: Mitsuhiro Mouri, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 359 days.

(21) Appl. No.: 17/701,700

(22) Filed: Mar. 23, 2022

(65) Prior Publication Data
US 2022/0366907 A1 Nov. 17, 2022

(30) Foreign Application Priority Data
May 13, 2021 (JP) .................................. 2021-081767

(51) Int. Cl.
*G10L 15/22* (2006.01)
*G01N 3/08* (2006.01)
*G10L 15/08* (2006.01)

(52) U.S. Cl.
CPC ................ *G10L 15/22* (2013.01); *G01N 3/08* (2013.01); *G10L 15/08* (2013.01); *G01N 2203/0017* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 2008/0268469 | A1  | 10/2008 | Srienc et al. |
| 2014/0122085 | A1* | 5/2014  | Piety ........................ G01M 7/00 |
|              |     |         | 702/56 |
| 2018/0053506 | A1* | 2/2018  | Konuma ................. G10L 15/22 |

FOREIGN PATENT DOCUMENTS

| JP | H07318565   |   | 12/1995 |
| JP | H11311595   |   | 11/1999 |
| JP | 2002250684  |   | 9/2002  |
| JP | 2002250684  | A * | 9/2002 |
| JP | 2003207429  |   | 7/2003  |
| JP | 2010524004  |   | 7/2010  |
| JP | 2018078359  |   | 5/2018  |

(Continued)

OTHER PUBLICATIONS

"Office Action of Japan Counterpart Application", issued on Mar. 12, 2024, with English translation thereof, p. 1-p. 9.

(Continued)

*Primary Examiner* — Nafiz E Hoque
(74) *Attorney, Agent, or Firm* — JCIPRNET

(57) ABSTRACT

A tensile tester includes a tester main body that executes a material test, an association storage portion that stores a specific word and instruction information to the tester main body in association with each other, a voice receiving portion that receives a voice from a user, an extraction portion that extracts the specific word from the voice by voice recognition processing, a determination portion that determines, with reference to the association storage portion, the instruction information corresponding to the specific word extracted by the extraction portion, and an instruction portion that outputs, to the tester main body, the instruction information determined by the determination portion.

2 Claims, 10 Drawing Sheets

(56) References Cited

FOREIGN PATENT DOCUMENTS

| JP | 2020051800 | 4/2020 |
| JP | 2020134627 | 8/2020 |

OTHER PUBLICATIONS

"Decision of Refusal of Japan Counterpart Application", issued on Jul. 30, 2024, with English translation thereof, pp. 1-9.
"Office Action of China Counterpart Application", issued on Mar. 27, 2025, with English translation thereof, p. 1-p. 17.

* cited by examiner

| KW1 | CM1 |
|---|---|
| FIRST WORD | FIRST INSTRUCTION INFORMATION |
| TEST START | START MATERIAL TEST |
| TEST END | END TEST BEING EXECUTED |
| RETURN START | RETURN HYDRAULIC ACTUATOR TO ORIGINAL POSITION |
| START INTER-JIG DISTANCE ADJUSTMENT | OPERATE HYDRAULIC ACTUATOR TO ADJUST DISTANCE BETWEEN JIGS TO SET VALUE |
| STOP | STOP OPERATION OF HYDRAULIC ACTUATOR |
| EXECUTE E-CAL | EXECUTE CALIBRATION OF SENSOR |
| CLEAR ALARM | CLEAR ALARM (CLOSE ALARM SCREEN) |
| JOG MODE | SWITCH TO JOG (MANUAL) OPERATION MODE |
| TEST MODE | SWITCH TO TEST START STANDBY STATE (SWITCH SCREEN OF OPERATION UNIT, JOG MODE OFF) |
| HYDRAULIC PRESSURE SOURCE OFF | BLOCK HYDRAULIC PRESSURE SOURCE |
| SHUT DOWN | BLOCK POWER OF TESTER |
| TEST FORCE 0 RESET | RESET TEST FORCE MEASUREMENT VALUE TO 0 |
| STROKE 0 RESET | RESET DISPLACEMENT MEASUREMENT VALUE TO 0 |

| THIRD WORD — KW3 | THIRD INSTRUCTION INFORMATION — CM3 |
|---|---|
| LOAD FILE NUMBER YY | LOAD TEST CONDITION FILE OF FILE NUMBER YY, SET LOADED FILE AS TEST CONDITION, AND PERFORM "TEST MODE" OPERATION |
| GENERATE TEST CONDITION | LOAD TEST CONDITION GENERATED AS INITIAL TEST CONDITION IN ADVANCE AND TRANSITION TO TEST CONDITION GENERATION SCREEN (USED WHEN CHANGING ONLY TEST SPEED EACH TIME) |

| KW1 | CM1 |
|---|---|
| FIRST WORD | FIRST INSTRUCTION INFORMATION |
| MEASUREMENT | PERFORM DATA COLLECTION |
| CLEANING | PERFORM CLEANING OPERATION |
| START BLANK MEASUREMENT | PERFORM BLANK MEASUREMENT |
| DILUTION | PERFORM DILUTION OPERATION |
| START WATER SUPPLY | OPERATE WATER SUPPLY PUMP |
| STOP WATER SUPPLY | STOP WATER SUPPLY PUMP |
| PUMP SPEED XX | CHANGE SPEED OF LIQUID FEEDING PUMP TO XX |
| PUMP OFF | STOP LIQUID FEEDING PUMP |
| PUMP ON | OPERATE LIQUID FEEDING PUMP |
| ULTRASONIC OFF | STOP ULTRASONIC DISPERSER |
| ULTRASONIC ON | OPERATE ULTRASONIC DISPERSER |
| START WATER DISCHARGE | OPEN WATER DISCHARGE VALVE |
| STOP WATER DISCHARGE | CLOSE WATER DISCHARGE VALVE |
| STIRRER OFF | STOP STIRRER |
| STIRRER ON | OPERATE STIRRER |
| ADJUST OPTICAL AXIS | PERFORM OPTICAL AXIS ADJUSTMENT |

| THIRD WORD | THIRD INSTRUCTION INFORMATION |
|---|---|
| LOAD FILE NUMBER YY | LOAD MEASUREMENT CONDITION FILE WHOSE FILE NUMBER IS YY, SET LOADED FILE AS MEASUREMENT CONDITION, AND EXECUTE "MEASUREMENT MODE" OPERATION. |

FIG. 10

MATERIAL TESTING MACHINE AND PARTICLE ANALYZING APPARATUS

INCORPORATION BY REFERENCE

The present application claims priority under 35 U.S.C. § 119 to Japanese Patent Application No. 2021-081767 filed on May 13, 2021. The content of the application is incorporated herein by reference in its entirety.

BACKGROUND

Technical Field

The present invention relates to a material testing machine and a particle analyzing apparatus.

Related Art

Various techniques for improving workability of an operator of a material testing machine are known.

For example, a material testing machine described in JP 2003-207429 A, after a command is given, each time an operation portion such as an operation panel or a keyboard is operated, stores the operation sequentially, and outputs the operation history based on the stored information as an operation procedure manual.

However, in the material testing machine described in JP 2003-207429 A, an operator needs to perform an operation on an operation input device including a button switch, a touch panel, and the like, and therefore there is room for improving workability of the operator.

For example, in a case where the operation on the operation input device is an operation by the operator's finger, it is difficult to operate the operation input device in a situation where the operator's hand is being used for test preparation or the like.

In addition, for example, in the operation on the operation input device, in a case where the operator wears a glove, it may be difficult to perform the operation of the touch panel or the operation of pressing the button switch. In such a case, the operator needs to take off glove for the operation.

SUMMARY

The present invention provides a material testing machine and a particle analyzing apparatus capable of improving workability of an operator.

A material testing machine according to a first aspect of the present invention includes a tester main body that executes a material test, an association storage portion that stores a specific word and instruction information to the tester main body in association with each other, a voice receiving portion that receives a voice from a user, an extraction portion that extracts the specific word from the voice by voice recognition processing, a determination portion that determines, with reference to the association storage portion, the instruction information corresponding to the specific word extracted by the extraction portion, and an instruction portion that outputs, to the tester main body, the instruction information determined by the determination portion.

A particle analyzing apparatus according to a second aspect of the present invention includes an analyzer main body that generates a sample image of a liquid sample in which particles are dispersed, an association storage portion that stores a specific word and instruction information to the analyzer main body in association with each other, a voice receiving portion that receives a voice from a user, an extraction portion that extracts the specific word from the voice by voice recognition processing, a determination portion that determines, with reference to the association storage portion, the instruction information corresponding to the specific word extracted by the extraction portion, and an instruction portion that outputs, to the analyzer main body, the instruction information determined by the determination portion.

The material testing machine according to the first aspect of the present invention and the particle analyzing apparatus according to the second aspect of the present invention can output instruction information to the tester main body or the analyzer main body based on a voice from a user. Therefore, workability of the operator can be improved.

BRIEF DESCRIPTION OF DRAWINGS

FIG. 3 is a table illustrating an example of a relationship between first words and first instruction information.

FIG. 5 is a table illustrating an example of a relationship between third words and third instruction information.

FIG. 8 is a table illustrating an example of a relationship between first words and first instruction information.

FIG. 10 is a table illustrating an example of a relationship between third words and third instruction information.

DETAILED DESCRIPTION

Hereinafter, present embodiments will be described with reference to drawings. The present embodiments include a tensile tester 1 according to a first embodiment that will described with reference to FIGS. 1 to 6 and a particle analyzing apparatus 6 according to a second embodiment that will be described with reference to FIGS. 7 to 10.

1. First Embodiment

1-1. Configuration of Tensile Tester

Figure 1:
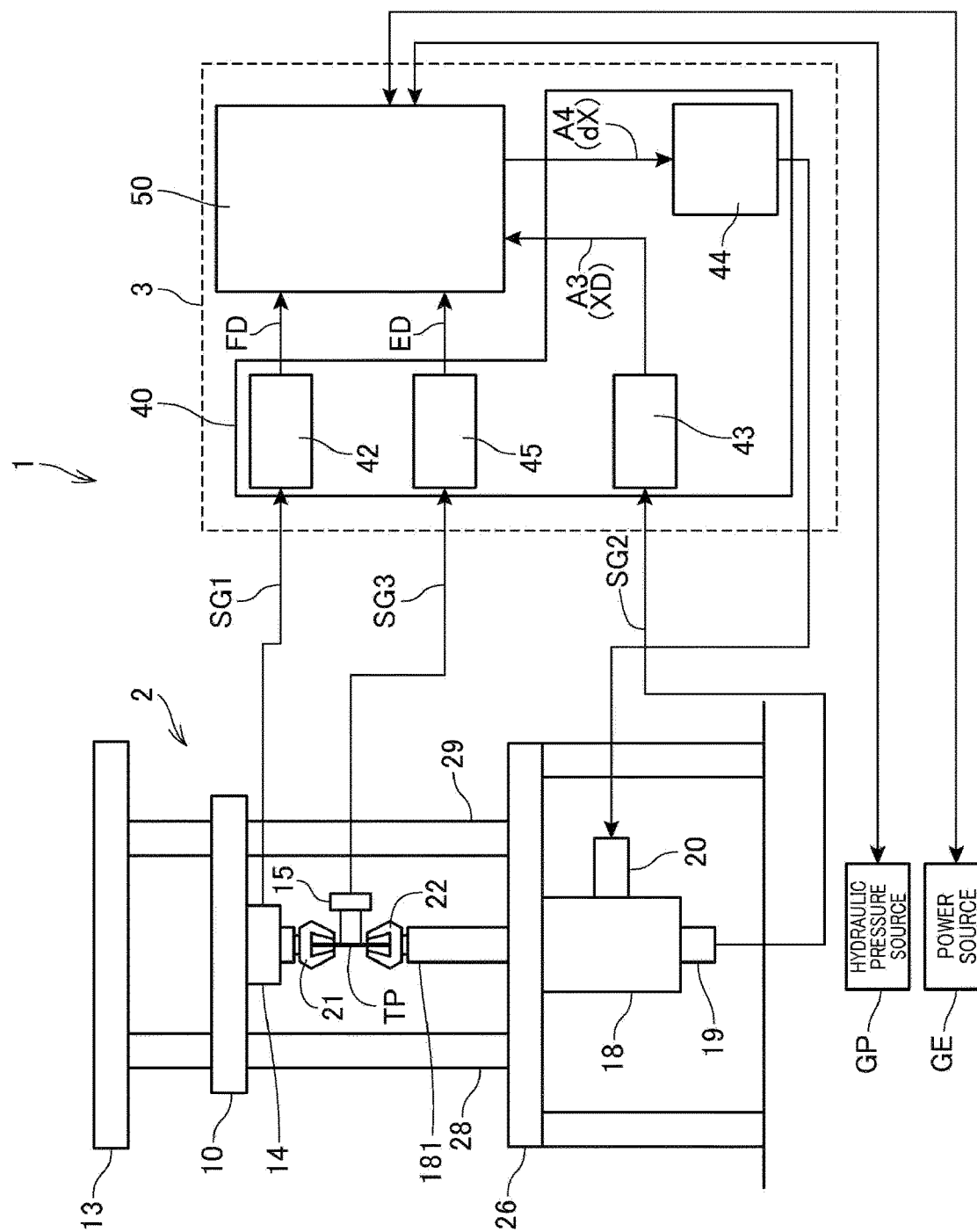
FIG. 1 is a diagram illustrating an example of a configuration of a tensile tester according to a first embodiment.

FIG. 1 is a diagram illustrating an example of a configuration of a tensile tester 1 according to the first embodiment.

The tensile tester 1 of the first embodiment performs a tensile test in which a test force is applied to a test piece TP to measure mechanical properties such as tensile strength, yield point, elongation, and drawing of the sample. The test force is a tensile force.

The tensile tester 1 includes a tester main body 2 that performs a tensile test by applying the test force to the test piece TP that is a material to be tested, and a control unit 3 that controls a tensile test operation by the tester main body 2.

The tensile tester 1 corresponds to an example of a "material testing machine".

As illustrated in FIG. 1, the tester main body 2 is configured such that a load frame is formed on a base 26 by a pair of pillars 28 and 29 and a yoke 13, and a crosshead 10 is fixed to the pillars 28 and 29.

A hydraulic actuator 18 is disposed on the base 26, and a lower gripper 22 for gripping a lower end portion of the test piece TP is attached to a piston rod 181 of the hydraulic actuator 18. An upper gripper 21 for gripping an upper end portion of the test piece TP is attached to a crosshead 10 via a load cell 14.

In the hydraulic actuator 18, a pressure oil direction and a pressure oil amount are controlled by a servo valve 20, and the piston rod 181 expands and contracts. As a result, the distance between the upper gripper 21 and the lower gripper 22 increases and decreases, and the test force is applied to the test piece TP fixed between the upper gripper 21 and the lower gripper 22. The stroke of the hydraulic actuator 18, that is, the displacement of the test piece TP is detected by a differential transformer 19 attached to the hydraulic actuator 18.

The load cell 14 is a sensor that measures the test force, which is a tensile load applied to the test piece TP, and outputs a test force measurement signal SG1 to the control unit 3.

The differential transformer 19 is a sensor that measures a displacement amount of the test piece TP and outputs a displacement measurement signal SG2 corresponding to the displacement amount to the control unit 3.

A displacement sensor 15 is disposed on the test piece TP. As the test piece TP, for example, a dumbbell-shaped test piece formed in a shape having a narrow center is used. The displacement sensor 15 is a sensor that measures an elongation measurement value ED by measuring the distance between a pair of gauge marks of the test piece TP, and outputs an elongation measurement signal SG3 to the control unit 3. The pair of gauge marks are arranged at an upper portion and a lower portion of the region where the test piece TP is narrow.

The tester main body 2 further includes a power source GE and a hydraulic pressure source GP.

The power source GE supplies power to each part of the tester main body 2. The power source GE supplies power to, for example, various motors and drives the motors. In addition, the power source GE supplies power to and drives a hydraulic pump and a hydraulic pressure control valve that are not illustrated.

The power source GE is configured as, for example, a voltage source. The power source GE supplies power to each part of the tester main body 2. The power source GE supplies a voltage of 100 V to the hydraulic pump and the various motors, for example, and supplies a voltage of 10 V to the control unit 3, for example.

The hydraulic pressure source GP supplies a hydraulic pressure to a hydraulic device constituting the tester main body 2. The hydraulic pressure source GP supplies, for example, a hydraulic pressure to the hydraulic actuator 18 to drive the hydraulic actuator 18. That is, the hydraulic actuator 18 is driven by the hydraulic pressure supplied from the hydraulic pressure source GP, and the piston rod 181 is thus expanded and contracted.

The hydraulic pressure source GP includes a hydraulic pump and a hydraulic pressure control valve that are not illustrated, and generates a hydraulic pressure by driving the hydraulic pump. Power is supplied from the power source GE to the hydraulic pump. The hydraulic pressure control valve adjusts the hydraulic pressure output from the hydraulic pressure source GP.

The control unit 3 includes a signal input/output device 40 and a control device 50.

The signal input/output device 40 constitutes an input/output interface circuit that transmits and receives signals to and from the tester main body 2, and in the first embodiment, includes a first sensor amplifier 42, a second sensor amplifier 45, a third sensor amplifier 43, and a servo amplifier 44.

The first sensor amplifier 42 is an amplifier that amplifies the test force measurement signal SG1 output from the load cell 14 to generate a test force measurement value FD, and outputs the test force measurement value FD to the control device 50.

The second sensor amplifier 45 is an amplifier that amplifies the elongation measurement signal SG3 output from the displacement sensor 15 to generate an elongation measurement value ED and outputs the elongation measurement value ED to the control device 50.

The third sensor amplifier 43 amplifies the displacement measurement signal SG2 output from the differential transformer 19 and outputs a displacement measurement signal A3 indicating a displacement measurement value XD to the control device 50 as a digital signal.

The servo amplifier 44 is a device that controls a servo valve 20 according to the control of the control device 50. The control device 50 calculates a command value dX of the displacement measurement value XD, and transmits a command signal A4 indicating the command value dX to the servo valve 20.

The control device 50 controls the operation of the tester main body 2 based on the operation from the user. In addition, the control device 50 causes the tester main body 2 to execute a tensile test.

In the first embodiment, the "user" includes an operator who operates the tester main body 2.

The control device 50 includes a computer including a storage device such as a hard disk drive (HDD) or a solid state drive (SSD), an interface circuit between the control device 50 and the signal input/output device 40, and various electronic circuits.

An A/D converter is provided in the interface circuit between the control device 50 and the signal input/output device 40, and the test force measurement signal SG1, the elongation measurement signal SG3, and the displacement measurement signal SG2 that are analog signals are converted into digital signals by the A/D converter.

Note that the control device 50 is not limited to a computer, and may be constituted by one or a plurality of appropriate circuits such as integrated circuits like IC chips and LSIs.

Figure 2:
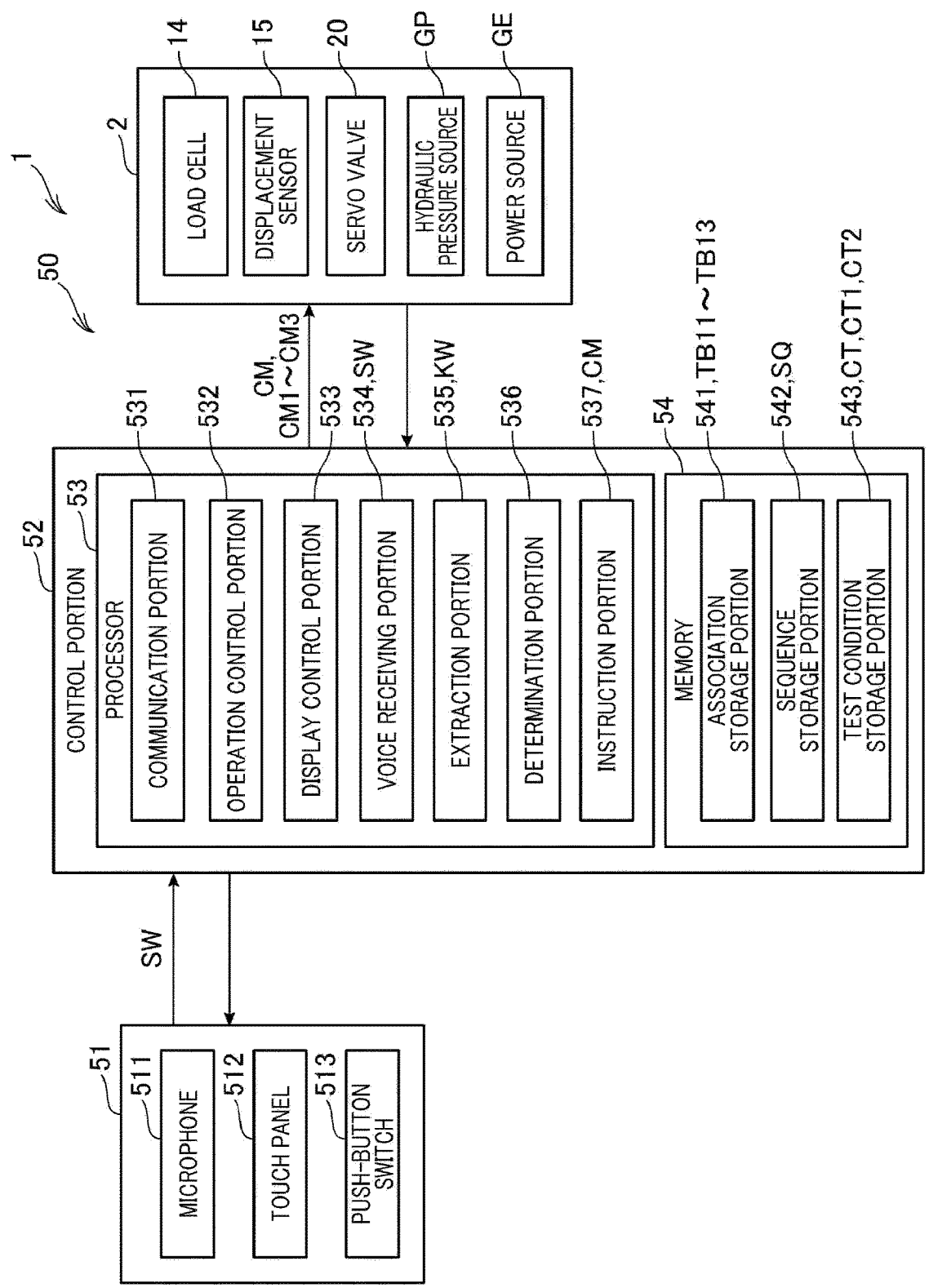
FIG. 2 is a diagram illustrating an example of a configuration of a control device.

FIG. 2 is a diagram illustrating an example of a configuration of the control device 50 according to the first embodiment.

The control device 50 includes a control portion 52.

The tester main body 2 further includes an operation panel 51.

The operation panel 51 includes a microphone 511, a touch panel 512, and a push-button switch 513.

The microphone 511 receives a voice from the user and generates a voice signal SW. The microphone 511 outputs the voice signal SW to the control portion 52.

The touch panel 512 includes a liquid crystal display (LCD) or the like, and displays various images on the LCD according to an instruction from the control portion 52. The touch panel 512 includes a touch sensor disposed along a display surface of the LCD. The touch sensor detects a touch by the user's fingertip or pen, and transmits a detection signal to the control portion 52.

The push-button switch 513 includes a plurality of push-button switches, receives various operations from the user, and transmits an operation signal corresponding to the operation to the control portion 52.

The control portion 52 is constituted by, for example, a personal computer, and controls the operation of the control device 50. The control portion 52 includes a processor 53 and a memory 54.

The processor 53 is constituted by a central processing unit (CPU), a micro-processing unit (MPU), or the like.

The memory 54 is constituted by a read only memory (ROM), a random access memory (RAM), or the like.

Note that the control portion 52 is not limited to a personal computer, and may be constituted by one or a plurality of appropriate circuits such as integrated circuits like IC chips and LSIs. The control portion 52 may be constituted by, for example, a tablet terminal, a smartphone, or the like.

The control portion 52 may include programmed hardware such as a digital signal processor (DSP) or a field programmable gate array (FPGA). The control portion 52 may include a system-on-a-chip (SoC)-FPGA.

1-2. Configuration of Control Portion

As illustrated in FIG. 2, the control portion 52 includes a communication portion 531, an operation control portion 532, a display control portion 533, a voice receiving portion 534, an extraction portion 535, a determination portion 536, an instruction portion 537, an association storage portion 541, a sequence storage portion 542, and a test condition storage portion 543.

Specifically, the processor 53 of the control portion 52 executes a control program stored in the memory 54 or a storage device to function as the communication portion 531, the operation control portion 532, the display control portion 533, the voice receiving portion 534, the extraction portion 535, the determination portion 536, and the instruction portion 537. In addition, the processor 53 of the control portion 52 executes a control program stored in the memory 54 or the storage device to cause the memory 54 to function as the association storage portion 541, the sequence storage portion 542, and the test condition storage portion 543.

The association storage portion 541 stores specific words KW and instruction information CM for the tester main body 2 in association with each other.

The specific words KW are words preset by the user and include a first word KW1, a second word KW2, and a third word KW3.

The instruction information CM indicates an instruction to the tester main body 2. The instruction information CM includes first instruction information CM1, second instruction information CM2, and third instruction information CM3. The first instruction information CM1 indicates an instruction corresponding to one operation of the tester main body 2. The second instruction information CM2 indicates an instruction corresponding to a plurality of consecutive operations of the tester main body 2. The third instruction information CM3 indicates an instruction to the tester main body 2 to set a test condition.

The first word KW1 is stored in the association storage portion 541 in association with the first instruction information CM1. The second word KW2 is stored in the association storage portion 541 in association with the second instruction information CM2. The third word KW3 is stored in the association storage portion 541 in association with the third instruction information CM3.

The first word KW1 to the third word KW3 and the first instruction information CM1 to the third instruction information CM3 will be specifically described with reference to FIGS. 3 to 5.

The sequence storage portion 542 stores a sequence SQ indicating a plurality of consecutive operations of the tester main body 2. Each of the plurality of operations constituting the sequence SQ is stored in the association storage portion 541 as, for example, the first instruction information CM1.

The sequence storage portion 542 stores a plurality of sequences SQ. Each of the plurality of sequences SQ is set by the user and stored in the sequence storage portion 542. Each of the plurality of sequences SQ is identified by a registration number. The registration number corresponds to an example of identification information.

The test condition storage portion 543 stores a plurality of test conditions CT executed by the tester main body 2. The plurality of test conditions CT are stored in the test condition storage portion 543 in advance.

Each of the plurality of test conditions CT is set by the user and stored in the test condition storage portion 543 in a file format, for example. Each of the plurality of test conditions CT is identified by the file number. The file number corresponds to an example of identification information.

In the first embodiment, the test conditions CT define the test conditions of the tensile test.

The test conditions CT include, for example, a first test condition CT1 for performing position control for the test force measurement value FD and a second test condition CT2 for performing speed control for the elongation measurement value ED.

The communication portion 531 controls communication with the signal input/output device 40 illustrated in FIG. 1.

For example, the communication portion 531 receives the test force measurement value FD, the elongation measurement value ED, and the displacement measurement value XD from the signal input/output device 40. In addition, for example, the communication portion 531 transmits the command signal A4 indicating the command value dX to the signal input/output device 40.

In addition, the communication portion 531 transmits various instruction information CM to, for example, the load cell 14, the displacement sensor 15, the servo valve 20, the hydraulic pressure source GP, and the power source GE in accordance with an instruction from the instruction portion 537.

For example, the communication portion 531 transmits instruction information CM for setting the offset of each of the load cell 14 and the displacement sensor 15 to 0. In addition, for example, the communication portion 531 transmits instruction information CM indicating activation to each of the hydraulic pressure source GP and the power source GE.

The operation control portion 532 controls the operation of the tester main body 2.

For example, when a tensile test corresponding to the first test condition CT1 for performing position control for the test force measurement value FD is executed, the operation control portion 532 calculates the command value dX of the displacement measurement value XD so that the test force measurement value FD matches the test force target value. Then, the communication portion 531 transmits the command signal A4 indicating the command value dX to the servo amplifier 44 of the signal input/output device 40.

For example, when a tensile test corresponding to the second test condition CT2 for performing speed control for the elongation measurement value ED is executed, the operation control portion 532 calculates the command value dX of the displacement measurement value XD so that an elongation speed measurement value EVD, which is the amount of change per unit time of the elongation measurement value ED, matches an elongation speed target value EVT. Then, the communication portion 531 transmits the command signal A4 indicating the command value dX to the servo amplifier 44 of the signal input/output device 40.

The display control portion 533 controls a screen and an image to be displayed on the LCD of the touch panel 512.

When the operation control portion 532 is executing the tensile test, the display control portion 533 displays, for example, a graph indicating a relationship between the displacement measurement value XD and at least one of the test force measurement value FD and the elongation measurement value ED on the LCD of the touch panel 512.

When the operation control portion 532 executes the tensile test corresponding to the first test condition CT1, the display control portion 533 displays, for example, a screen indicating the first test condition CT1 on the LCD of the touch panel 512. When the operation control portion 532 executes the tensile test corresponding to the second test condition CT2, the display control portion 533 displays, for example, a screen indicating the second test condition CT2 on the LCD of the touch panel 512.

The voice receiving portion 534 receives a voice from a user. Specifically, the voice receiving portion 534 receives the voice signal SW generated by the microphone 511 according to the voice from the user.

Note that, in the following description, for convenience, the voice signal SW is not limited to an analog signal and examples thereof also include digital information. That is, examples of the voice signal SW also include audio information obtained by A/D converting the voice signal SW.

The extraction portion 535 extracts the specific word KW from the voice signal SW by voice recognition processing. The voice signal SW may include, for example, a murmur of a worker, a conversation with another worker, and the like. The extraction portion 535 removes the murmur of the worker, conversation with another worker, and the like included in the voice signal SW, and extracts the specific word KW.

In other words, the extraction portion 535 determines whether the specific word KW stored in the association storage portion 541 is included in the voice signal SW, and extracts the specific word KW when the specific word KW is included.

Furthermore, the extraction portion 535 may determine the degree of coincidence with the specific word KW and extract the specific word KW in a case where the degree of coincidence is equal to or greater than a preset threshold value. The threshold value is, for example, 90%.

The determination portion 536 determines the instruction information CM corresponding to the specific word KW extracted by the extraction portion 535 with reference to the association storage portion 541.

In other words, the determination portion 536 determines the instruction information CM by loading, from the association storage portion 541, the instruction information CM corresponding to the specific word KW extracted by the extraction portion 535.

The instruction portion 537 outputs the instruction information CM determined by the determination portion 536 to the tester main body 2.

In the first embodiment, the instruction portion 537 outputs the instruction information CM to the tester main body 2 via, for example, the operation control portion 532 and the communication portion 531.

The instruction information CM will be further described with reference to FIGS. 3 to 5.

FIG. 3 is a table illustrating an example of a relationship between the first word KW1 and the first instruction information CM1.

FIG. 3 illustrates a first table TB11. The first table TB11 is stored in the association storage portion 541 illustrated in FIG. 2.

The first word KW1 is stored in the left column of the first table TB11, and the first instruction information CM1 corresponding to the first word KW1 is stored in the right column of the first table TB11.

For example, when the first word KW1 is "test start", the instruction portion 537 instructs the tester main body 2 to "start the material test" as indicated by the first instruction information CM1.

For example, when the first word KW1 is "test end", the instruction portion 537 instructs the tester main body 2 to "end the test being executed" as indicated by the first instruction information CM1.

For example, when the first word KW1 is "return start", the instruction portion 537 instructs the servo valve 20 of the tester main body 2 to "return the hydraulic actuator to the original position" as indicated by the first instruction information CM1.

For example, when the first word KW1 is "stop", the instruction portion 537 instructs the servo valve 20 of the tester main body 2 to "stop the operation of the hydraulic actuator" as indicated by the first instruction information CM1.

For example, when the first word KW1 is "jog mode", the instruction portion 537 instructs the tester main body 2 to "switch to a jog (manual) operation mode" as indicated by the first instruction information CM1.

For example, when the first word KW1 is "test mode", the instruction portion 537 instructs the tester main body 2 to "switch to a test start standby state" as indicated by the first instruction information CM1.

For example, when the first word KW1 is "hydraulic pressure source off", the instruction portion 537 instructs the hydraulic pressure source GP of the tester main body 2 to "block the hydraulic pressure source" as indicated by the first instruction information CM1.

For example, when the first word KW1 is "shut down", the instruction portion 537 instructs the power source GE of the tester main body 2 to "block the power of the tester" as indicated by the first instruction information CM1.

For example, when the first word KW1 is "test force 0 reset", the instruction portion 537 instructs the load cell 14 of the tester main body 2 to "reset the test force measurement value to 0" as indicated by the first instruction information CM1.

For example, when the first word KW1 is "stroke 0 reset", the instruction portion 537 instructs the differential transformer 19 of the tester main body 2 to "reset the displacement measurement value to 0" as indicated by the first instruction information CM1.

As described with reference to FIG. 3, when the operator utters a voice including the first word KW1 so as to be input to the microphone 511, the first instruction information CM1 corresponding to one operation can be output to the tester main body 2. Therefore, even when the operator is at a position away from the tester main body 2 (the operation panel 51), the operator can easily instruct one operation to the tester main body 2. Therefore, workability of the operator can be improved.

Figure 4:
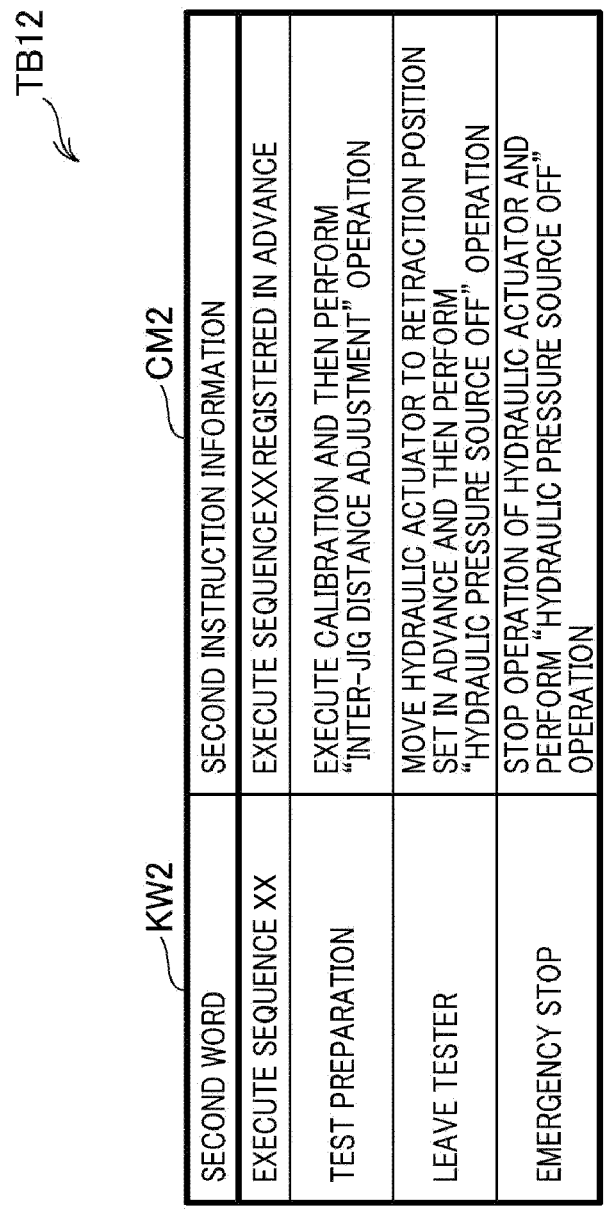
FIG. 4 is a table illustrating an example of a relationship between second words and second instruction information.

FIG. 4 is a table illustrating an example of a relationship between the second word KW2 and the second instruction information CM2.

FIG. 4 illustrates a second table TB12. The second table TB12 is stored in the association storage portion 541 illustrated in FIG. 2.

The second word KW2 is stored in the left column of the second table TB12, and the second instruction information CM2 corresponding to the second word KW2 is stored in the right column of the second table TB12.

For example, when the second word KW2 is "execute sequence XX", the instruction portion 537 instructs the tester main body 2 to "execute the sequence XX registered in advance" as indicated by the second instruction information CM2. Here, "registration" indicates that the user sets the content of the second instruction information CM2 corresponding to the sequence SQ and stores the content in the sequence storage portion 542.

In the first embodiment, the sequence SQ indicates an instruction corresponding to a plurality of consecutive operations of the tester main body 2. "XX" of "sequence XX" indicates identification information of the sequence SQ stored in advance in the sequence storage portion 542. "XX" in "sequence XX" is, for example, a registration number.

The sequence SQ is stored in the sequence storage portion 542 illustrated in FIG. 2.

For example, when the second word KW2 is "test preparation", the instruction portion 537 instructs the tester main body 2 to "execute calibration and then perform "inter-jig distance movement" operation" as indicated by the second instruction information CM2. Here, the "inter-jig distance movement" means that, as illustrated in FIG. 3, the lower gripper 22 is moved by the hydraulic actuator 18 such that the distance between the upper gripper 21 and the lower gripper 22 becomes a predetermined distance set in advance.

For example, when the second word KW2 is "emergency stop", the instruction portion 537 instructs the tester main body 2 to "stop the operation of the hydraulic actuator, and perform an operation of "hydraulic pressure source off"" as indicated by the second instruction information CM2. The operation of the hydraulic actuator 18 is stopped by controlling the servo valve 20. In "hydraulic pressure source off", the operation of the hydraulic pressure source GP is stopped as illustrated in FIG. 3.

As described with reference to FIG. 4, when the operator utters a voice including the second word KW2 so as to be input to the microphone 511, the second instruction information CM2 corresponding to a plurality of consecutive operations can be output to the tester main body 2. Therefore, even when the operator is at a position away from the tester main body 2 (the operation panel 51), the operator can easily instruct a plurality of consecutive operations to the tester main body 2. Therefore, workability of the operator can be improved.

FIG. 5 is a table illustrating an example of a relationship between the third word KW3 and the third instruction information CM3.

FIG. 5 illustrates a third table TB13. The third table TB13 is stored in the association storage portion 541 illustrated in FIG. 2.

The third word KW3 is stored in the left column of the third table TB13, and the third instruction information CM3 corresponding to the third word KW3 is stored in the right column of the third table TB13.

For example, when the third word KW3 is "load file number YY", the instruction portion 537 instructs the tester main body 2 to "load a test condition file whose file number is YY, set the test condition file as the test condition, and execute a "test mode" operation" as indicated by the third instruction information CM3.

The test condition file is stored in the test condition storage portion 543 illustrated in FIG. 2. That is, the test condition file whose file number is YY is loaded from the test condition storage portion 543.

The "test mode" operation indicates switching to a test start standby state as illustrated in FIG. 3.

As described with reference to FIG. 5, when the operator utters a voice including the third word KW3 so as to be input to the microphone 511, the third instruction information CM3 for setting the test condition CT for the tester main body 2 can be output to the tester main body 2. Therefore, even when the operator is at a position away from the tester main body 2 (the operation panel 51), the operator can easily set a desired test condition CT for the tester main body 2. Therefore, workability of the operator can be improved.

1-3. Processing of Control Unit

Next, processing executed by the control portion 52 will be described with reference to FIG. 6.

Figure 6:
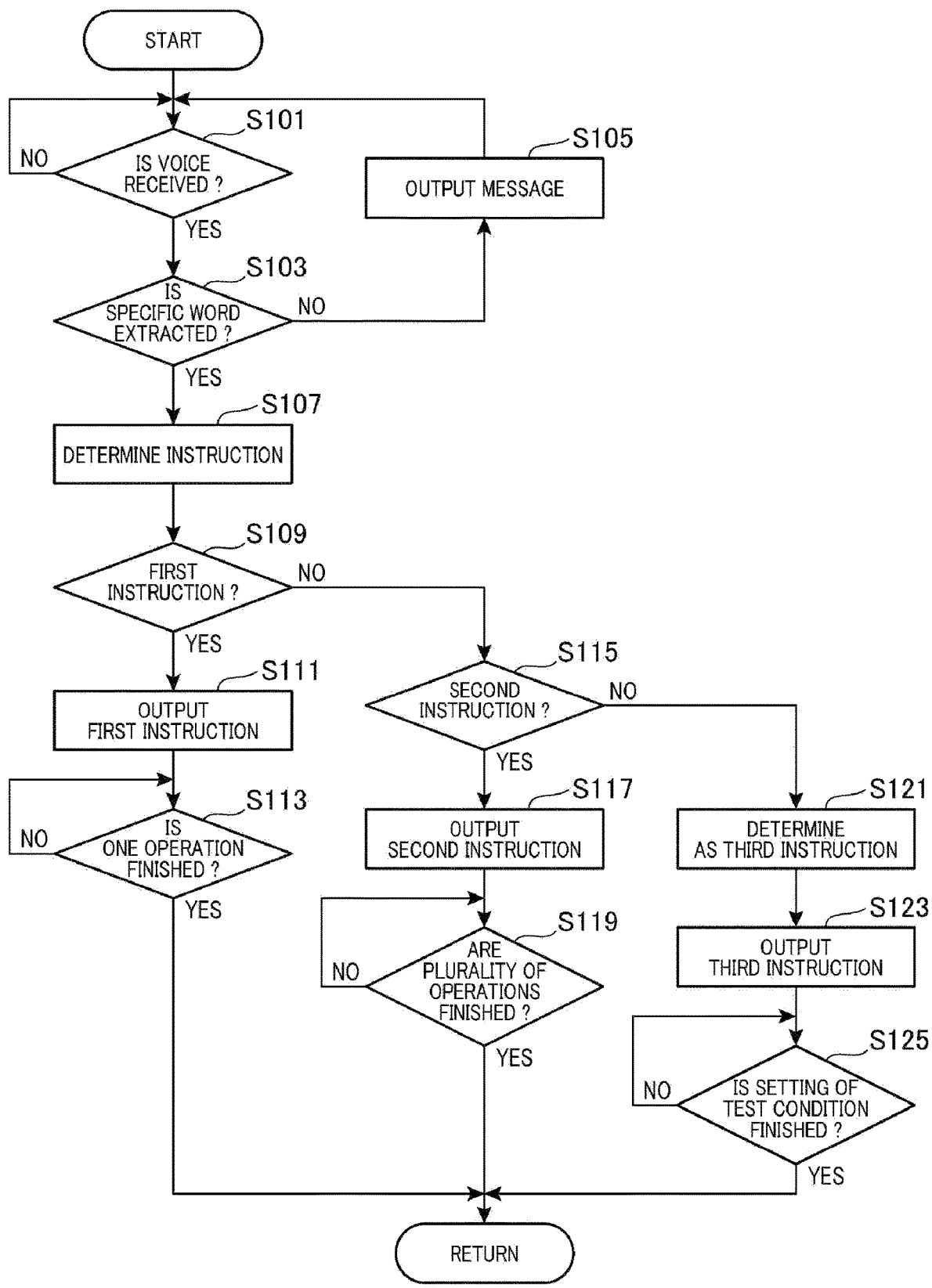
FIG. 6 is a flowchart illustrating an example of processing executed by a control unit.

FIG. 6 is a flowchart illustrating an example of processing executed by the control portion 52

In the first embodiment, the first table TB11 illustrated in FIG. 3, the second table TB12 illustrated in FIG. 4, and the third table TB13 illustrated in FIG. 5 are stored in advance in the association storage portion 541. The plurality of sequences SQ are stored in advance in the sequence storage portion 542, and the plurality of test conditions CT are stored in advance in the test condition storage portion 543.

As illustrated in FIG. 6, first, in step S101, the voice receiving portion 534 receives a voice from the user. Specifically, the voice receiving portion 534 receives the voice signal SW generated by the microphone 511 according to the voice from the user.

Next, in step S103, the extraction portion 535 determines whether or not the specific word KW has been extracted from the voice signal SW by voice recognition processing.

When the extraction portion 535 determines that the specific word KW has not been extracted (step S103; NO), the process proceeds to step S105.

Then, in step S105, the display control portion 533 displays, on the LCD of the touch panel 512, a message indicating that the specific word KW has not been extracted. Thereafter, the process returns to step S101.

When the extraction portion 535 determines that the specific word KW has been extracted (step S103; YES), the process proceeds to step S107.

Then, in step S107, the determination portion 536 determines the instruction information CM corresponding to the specific word KW with reference to the association storage portion 541.

Next, in step S109, the instruction portion 537 determines whether or not the instruction information CM determined by the determination portion 536 is the first instruction information CM1.

When the instruction portion 537 determines that the instruction information CM is not the first instruction information CM1 (step S109; NO), the process proceeds to step S115. When the instruction portion 537 determines that the instruction information CM is the first instruction information CM1 (step S109; YES), the process proceeds to step S111.

Then, in step S111, the instruction portion 537 outputs the first instruction information CM1 to the tester main body 2.

Next, in step S113, the control portion 52 determines whether or not one operation corresponding to the first instruction information CM1 has been finished.

When the control portion 52 determines that the one operation corresponding to the first instruction information CM1 has not been finished (step S113; NO), the process enters a standby state. When the control portion 52 determines that the one operation corresponding to the first instruction information CM1 has been completed (step S113; YES), the process returns to step S101.

In the case where the result of step S109 is NO, in step S115 the instruction portion 537 determines whether or not the instruction information CM determined by the determination portion 536 is the second instruction information CM2.

When the instruction portion 537 determines that the instruction information CM is not the second instruction information CM2 (step S115; NO), the process proceeds to step S121. When the instruction portion 537 determines that the instruction information CM is the second instruction information CM2 (step S115; YES), the process proceeds to step S117.

Then, in step S117, the instruction portion 537 outputs the second instruction information CM2 to the tester main body 2.

Next, in step S119, the control portion 52 determines whether or not a plurality of operations corresponding to the second instruction information CM2 have been finished.

When the control portion 52 determines that the plurality of operations corresponding to the second instruction information CM2 have not been finished (step S119; NO), the process enters a standby state. When the control portion 52 determines that the plurality of operations corresponding to the second instruction information CM2 have been completed (step S119; YES), the process returns to step S101.

In the case where the result of step S115 is NO, in step S121 the instruction portion 537 determines the instruction information CM determined by the determination portion 536 is the third instruction information CM3.

Then, in step S123, the instruction portion 537 outputs the third instruction information CM3 to the tester main body 2.

Next, in step S125, the control portion 52 determines whether or not setting of the test condition CT corresponding to the third instruction information CM3 has been finished.

When the control portion 52 determines that the setting of the test condition CT corresponding to the third instruction information CM3 has not been finished (step S125; NO), the process enters a standby state. When the control portion 52 determines that the setting of the test condition CT corresponding to the third instruction information CM3 has been finished (step S125; YES), the process returns to step S101.

As described with reference to FIG. 6, the voice receiving portion 534 receives the voice signal SW generated by the microphone 511 according to the voice from the user, and the extraction portion 535 extracts the specific word KW from the voice signal SW by the voice recognition processing. Then, the determination portion 536 determines, with reference to the association storage portion 541, the instruction information CM corresponding to the specific word KW extracted by the extraction portion 535, and the instruction portion 537 outputs the instruction information CM to the tester main body 2.

Therefore, when the operator utters a voice including the specific word KW so as to be input to the microphone 511, the instruction information CM corresponding to the specific word KW can be output to the tester main body 2. Therefore, even when the operator is at a position away from the tester main body 2 (the operation panel 51), the operator can easily instruct the instruction information CM to the tester main body 2. Therefore, workability of the operator can be improved.

In the material testing machine 1, as a test preparation operation, the operator may set heavy objects such as the upper gripper 21 and the lower gripper 22 in the tester main body 2. In such a case, even when the operator is at a position away from the tester main body 2 during the test preparation operation, the operator can easily output the instruction information CM to the tester main body 2. Therefore, the safety of the operator can be improved.

2. Second Embodiment 2-1. Configuration of Particle Analyzing Apparatus

Figure 7:
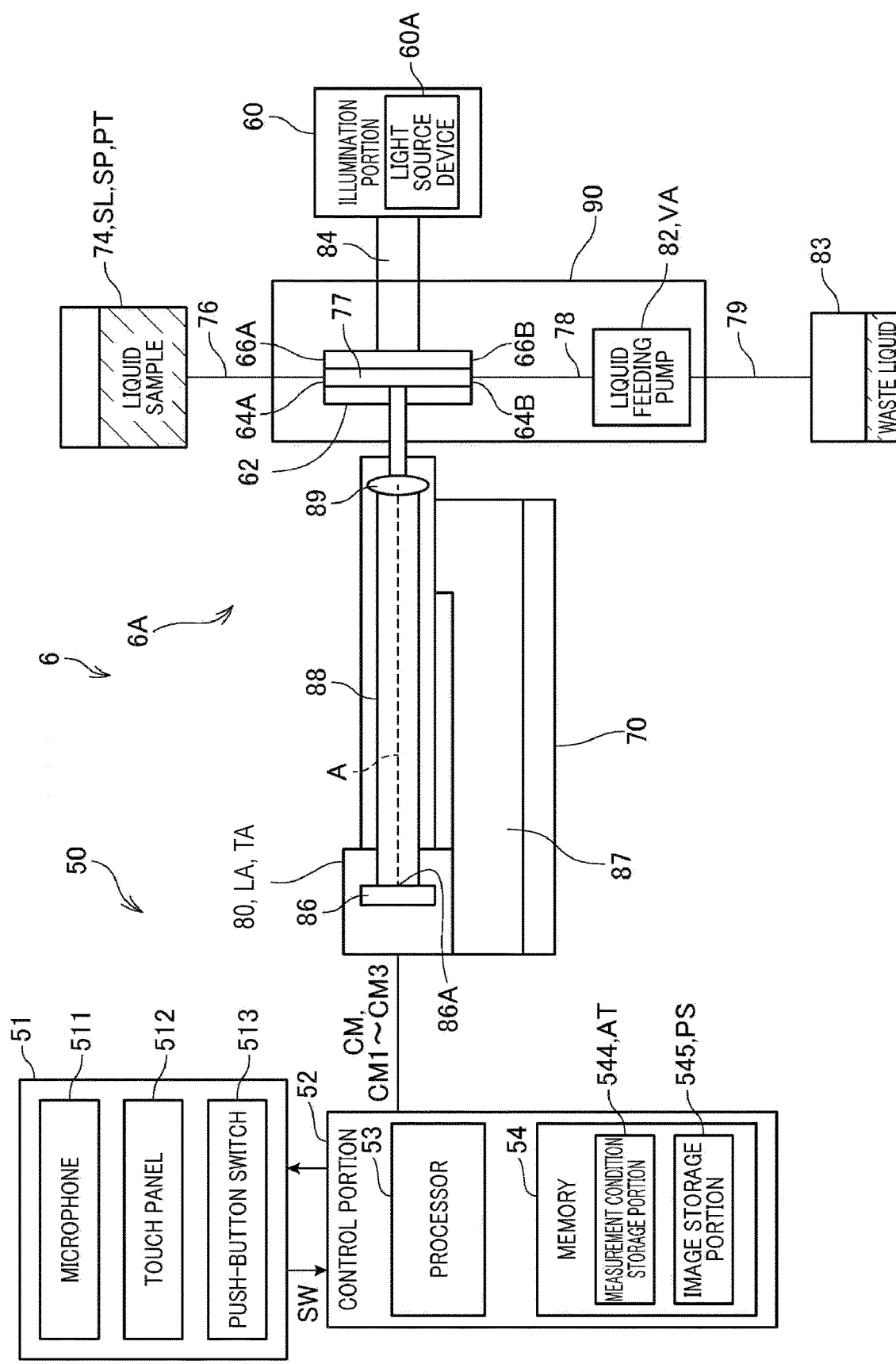
FIG. 7 is a diagram illustrating an example of a configuration of a particle analyzing apparatus according to a second embodiment.

FIG. 7 is a diagram illustrating an example of a configuration of a particle analyzing apparatus 6 according to a second embodiment.

As illustrated in FIG. 7, the particle analyzing apparatus 6 includes an analyzer main body 6A and a control device 50.

The particle analyzing apparatus 6 causes a liquid sample SL in which particle PT of a powder sample SP are dispersed to flow in a flow path 77 at a predetermined speed VA, and analyzes an image of the particle PT of the powder sample SP included in a sample image PS obtained by photographing the liquid sample SL at a predetermined cycle TA. In addition, the particle analyzing apparatus 6 analyzes the particle properties of the particles PT of the powder sample SP based on the result of the image analysis.

The powder sample SP is, for example, a powder of an industrial product such as a pigment, a cosmetic powder, a toner, a particulate catalyst, an abrasive, a powdered medicine, a synthetic resin powder, fine ceramic particles, or metal particles. The particle property is typically a particle shape, and examples thereof include an equivalent circle diameter, a circularity, an aspect ratio, and the like.

The particle analyzing apparatus 6 analyzes an image of the particle PT of the powder sample SP by, for example, a dynamic image analysis method defined in JIS Z8827-2.

The size of the particles PT of the powder sample SP is, for example, 5 μm to 100 μm.

The analyzer main body 6A illustrated in FIG. 7 generates a sample image PS of the liquid sample SL in which the particles PT are dispersed.

As illustrated in FIG. 7, the analyzer main body 6A includes a flow cell 62, a liquid sample supply mechanism 90, an illumination portion 60, a camera 80, and a focus mechanism 70.

The flow cell 62 is an optically substantially transparent measurement container and is formed in a substantially rectangular plate shape. An introduction port 64A for introducing the liquid sample SL is formed on an upper end surface 66A of the flow cell 62, a discharge port 64B for discharging the liquid sample SL is formed on a lower end surface 66B of the flow cell 62, and a flow path 77 from the introduction port 64A to the discharge port 64B is linearly formed.

The flow cell 62 of the second embodiment is provided with a focus target (not illustrated) for focusing, and the control portion 52 is configured to focus the camera 80 on the basis of the focus target.

The liquid sample supply mechanism 90 is a mechanism that feeds the liquid sample SL into the flow cell 62 by a predetermined amount per unit time, and includes a liquid feeding pump 82. In other words, the liquid feeding pump 82 causes the liquid sample SL to flow in the flow path 77 at the predetermined speed VA. The predetermined speed VA is, for example, 14.5 mm/sec.

In the second embodiment, an introduction pipe 76 extending from a liquid sample storage container 74 that stores the liquid sample SL is connected to the introduction port 64A of the flow cell 62. One end of a discharge pipe 78 is connected to the discharge port 64B, and a suction side of the liquid feeding pump 82 is connected to the other end of the discharge pipe 78.

When the liquid feeding pump 82 is operated, the liquid sample SL in the liquid sample storage container 74 flows into the flow path 77 of the flow cell 62 from the introduction port 64A, and is discharged from the discharge port 64B via the flow path 77.

A waste liquid pipe 79 is connected to a discharge side of the liquid feeding pump 82, and the liquid sample discharged by the liquid feeding pump 82 is collected in a waste liquid tank 83 through the waste liquid pipe 79. The liquid feeding pump 82 may be provided on the introduction pipe 76 side.

The illumination portion 60 includes a light source device 60A that irradiates the flow cell 62 with measurement light 84. The light source device 60A of the second embodiment emits the measurement light 84 that is approximately parallel light from a direction approximately orthogonal to the flow path 77 of the flow cell 62. The light source device 60A includes a light source having a light emitting element such as a light emitting diode (LED) light source or a laser light source, and a collimating optical system that collimates light emitted from the light source. Note that the light source device 60A may include, as a light source, a planar light source that emits light in a planar shape, such as a chip on board (COB) type LED.

The camera 80 is disposed at a position facing the illumination portion 60 with the flow cell 62 interposed therebetween, and captures an irradiation position of the measurement light 84 in the flow cell 62 at a predetermined cycle TA according to an instruction from the control portion 52. The camera 80 of the second embodiment includes an imaging element 86 which is an imaging sensor, and a telecentric microscope 88.

The imaging element 86 is constituted by a charge coupled device (CCD), a complementary metal oxide semiconductor (CMOS), or the like. The telecentric microscope 88 is a telecentric optical system that forms an image of an irradiation position in the flow cell 62 on an imaging surface 86A of the imaging element 86, and includes a telecentric lens 89 provided to face the flow cell 62.

The imaging speed of the camera 80 is, for example, 8 FPS. That is, the predetermined cycle TA is 0.125 seconds. The predetermined cycle TA is set to satisfy the following condition.

That is, each of the predetermined speed VA and the predetermined cycle TA is set so that the particles flowing in the flow path 77 are not included in the two consecutively captured sample images PS.

In other words, the predetermined speed VA and the predetermined cycle TA are set to satisfy the following Formula (1).

$$VA > LA/TA \tag{1}$$

Here, the length LA indicates the length of the particle PT in the flow direction in the field of view of the camera 80. For example, the length LA is 1.8 mm. In this case, the value on the right side of Formula (1) is 14.4 (=1.8/0.125) mm/sec, and when the predetermined speed VA is 14.5 mm/sec, Formula (1) is satisfied.

As described above, each of the predetermined speed VA and the predetermined cycle TA is set so that the particle PT flowing in the flow path 77 are not included in the two consecutively captured sample images PS, and thus, it is possible to prevent images of the same particle PT from being captured a plurality of times.

The focus mechanism 70 is a mechanism that changes the focus of the telecentric microscope 88, and includes a lens drive mechanism 87. The lens drive mechanism 87 is a mechanism that changes the focus of the camera 80 by driving the telecentric lens 89 along an optical axis A of the telecentric optical system under the control of the control portion 52.

The control device 50 has substantially the same configuration as the control device 50 according to the first embodiment illustrated in FIG. 2.

That is, the control device 50 includes a control portion 52. In addition, the analyzer main body 6A further includes an operation panel 51.

The operation panel 51 includes a microphone 511, a touch panel 512, and a push-button switch 513.

The microphone 511 receives a voice from the user and generates a voice signal SW corresponding to the voice. The microphone 511 outputs the generated voice signal SW to the control portion 52.

The touch panel 512 includes a liquid crystal display (LCD) or the like, and displays various images on the LCD according to an instruction from the control portion 52. The touch panel 512 includes a touch sensor disposed along a display surface of the LCD. The touch sensor detects a touch by the user's fingertip or pen, and transmits a detection signal to the control portion 52.

The push-button switch 513 includes a plurality of push-button switches, receives various operations from the user, and transmits an operation signal corresponding to the operation to the control portion 52.

2-2. Configuration of Control Portion

The control portion 52 is constituted by, for example, a personal computer, and controls the operation of the analyzer main body 6A.

The control portion 52 includes a processor 53, a memory 54, a storage device such as an HDD or an SSD, and an interface circuit for connecting the camera 80 and the like thereto. The processor 53 is constituted by a CPU, an MPU, or the like. The memory 54 is constituted by a ROM or the like.

Note that the control portion 52 is not limited to a personal computer, and may be constituted by one or a plurality of appropriate circuits such as integrated circuits like IC chips and LSIs. The control portion 52 may be constituted by, for example, a tablet terminal, a smartphone, or the like.

The control portion 52 may include programmed hardware such as a DSP or an FPGA. In addition, the control portion 52 may include an SoC-FPGA.

Similarly to the control portion 52 illustrated in FIG. 2, the control portion 52 includes a communication portion 531, an operation control portion 532, a display control portion 533, a voice receiving portion 534, an extraction portion 535, a determination portion 536, an instruction portion 537, an association storage portion 541, and a sequence storage portion 542.

The control portion 52 includes a measurement condition storage portion 544 and an image storage portion 545 instead of the test condition storage portion 543 illustrated in FIG. 2.

Specifically, the processor 53 of the control portion 52 executes a control program stored in the memory 54 or a storage device to function as the communication portion 531, the operation control portion 532, the display control portion 533, the voice receiving portion 534, the extraction portion 535, the determination portion 536, and the instruction portion 537. In addition, the processor 53 of the control portion 52 executes a control program stored in the memory 54 or the storage device to cause the memory 54 to function as the association storage portion 541, the sequence storage portion 542, the measurement condition storage portion 544, and the image storage portion 545.

In the following description, points different from the control portion 52 illustrated in FIG. 2 will be mainly described, and description of the same elements as in the control portion 52 illustrated in FIG. 2 will be omitted.

However, the tester main body 2 in the description of the control portion 52 illustrated in FIG. 2 corresponds to the analyzer main body 6A for the control portion 52 illustrated in FIG. 7.

The measurement condition storage portion 544 stores a plurality of measurement conditions AT executed by the analyzer main body 6A. The plurality of measurement conditions AT are stored in the measurement condition storage portion 544 in advance.

Each of the plurality of measurement conditions AT is set by the user and stored in the measurement condition storage portion 544 in a file format, for example. Each of the plurality of measurement conditions AT is identified by a file number. The file number corresponds to an example of identification information.

The measurement condition AT includes a condition for generating the sample image PS. Specifically, the measurement condition AT includes, for example, a predetermined speed VA at which the liquid sample SL flows in the flow path 77 illustrated in FIG. 7, an imaging speed (predetermined cycle TA) of the camera 80 illustrated in FIG. 7, and a length LA of the particle PT in the flow direction in the field of view of the camera 80 illustrated in FIG. 7.

In addition, the measurement condition AT may include a condition for analyzing the sample image PS.

In accordance with an instruction from the operation control portion 532, the image storage portion 545 stores the sample image PS obtained by imaging the liquid sample SL at the predetermined cycle TA by the camera 80.

The communication portion 531 controls communication with the analyzer main body 6A illustrated in FIG. 7.

In other words, the communication portion 531 controls communication with each part of the analyzer main body 6A. Specifically, the communication portion 531 controls communication with, for example, each of the liquid sample supply mechanism 90, the illumination portion 60, the camera 80, and the focus mechanism 70.

The operation control portion 532 adjusts autofocus of the camera 80 and adjusts imaging timing of the camera 80.

The operation control portion 532 adjusts the focus of the camera 80 (telecentric microscope 88) on the basis of the captured image of the focus target of the flow cell 62. Specifically, the operation control portion 532 receives the image captured by the camera 80, and determines deviation between the focus of the camera 80 and the focus target on the basis of the imaging state of the focus target captured in the captured image. Then, the operation control portion 532 controls the lens drive mechanism 87 so that the telecentric lens 89 moves to a position where the focus deviation is eliminated. In this way, the operation control portion 532 can focus the camera 80 on the focus target.

In addition, the operation control portion 532 causes the camera 80 to image the liquid sample SL at a predetermined cycle TA to generate the sample image PS. In addition, the operation control portion 532 stores the generated sample image PS in the image storage portion 545.

FIG. 8 is a table illustrating an example of a relationship between the first word KW1 and the first instruction information CM1.

FIG. 8 illustrates a first table TB21. The first table TB21 is stored in the association storage portion 541 illustrated in FIG. 2.

The first word KW1 is stored in the left column of the first table TB21, and the first instruction information CM1 corresponding to the first word KW1 is stored in the right column of the first table TB21.

For example, when the first word KW1 is "start water supply", the instruction portion 537 instructs the analyzer main body 6A to "start the operation of the water supply pump" as indicated by the first instruction information CM1. The water supply pump is a pump that supplies water to the liquid sample storage container 74 illustrated in FIG. 7.

For example, when the first word KW1 is "stop water supply", the instruction portion 537 instructs the analyzer main body 6A to "stop the operation of the water supply pump" as indicated by the first instruction information CM1.

For example, when the first word KW1 is "pump speed XX", the instruction portion 537 instructs the analyzer main body 6A to "change the speed of the liquid feeding pump to XX" as indicated by the first instruction information CM1. Here, the "speed of the liquid feeding pump" indicates the flow speed (predetermined speed VA, e.g. 14.5 mm/s) of the liquid sample SL flowing in the flow path 77.

As described with reference to FIG. 8, when the operator utters a voice including the first word KW1 so as to be input to the microphone 511, the first instruction information CM1 corresponding to one operation can be output to the analyzer main body 6A. Therefore, even when the operator is at a position away from the analyzer main body 6A (the operation panel 51), the operator can easily instruct one operation to the analyzer main body 6A. Therefore, workability of the operator can be improved.

Figure 9:
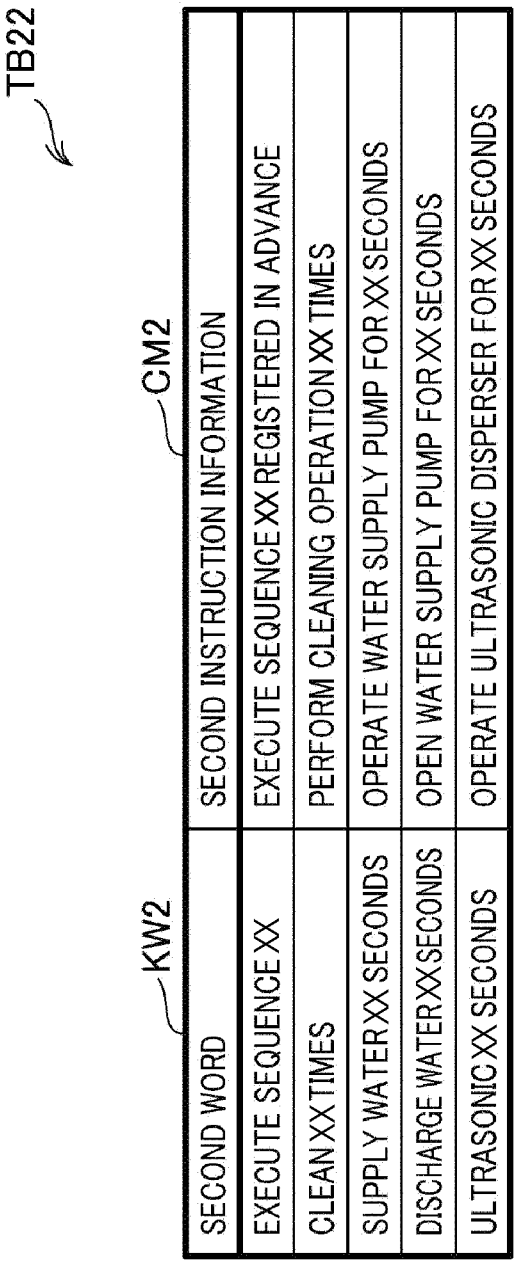
FIG. 9 is a table illustrating an example of a relationship between second words and second instruction information.

FIG. 9 is a table illustrating an example of a relationship between the second word KW2 and the second instruction information CM2.

FIG. 9 illustrates a second table TB22. The second table TB22 is stored in the association storage portion 541 illustrated in FIG. 2.

The second word KW2 is stored in the left column of the second table TB22, and the second instruction information CM2 corresponding to the second word KW2 is stored in the right column of the second table TB22.

For example, when the second word KW2 is "execute sequence XX", the instruction portion 537 instructs the analyzer main body 6A to "execute the sequence XX registered in advance" as indicated by the second instruction information CM2. Here, "registration" indicates that the user sets the content of the second instruction information CM2 corresponding to the sequence SQ and stores the content in the sequence storage portion 542.

In the second embodiment, the sequence SQ indicates an instruction corresponding to a plurality of consecutive operations of the analyzer main body 6A. "XX" of "sequence XX" indicates identification information of the sequence SQ stored in advance in the sequence storage portion 542. "XX" in "sequence XX" is, for example, a registration number.

The sequence SQ is stored in the sequence storage portion 542 illustrated in FIG. 2.

For example, when the second word KW2 is "supply water for XX seconds", the instruction portion 537 instructs the analyzer main body 6A to "operate the water supply pump for XX seconds" as indicated by the second instruction information CM2. That is, the instruction portion 537 instructs the analyzer main body 6A to perform a plurality of consecutive operations of starting the operation of the water supply pump and stopping the operation of the water supply pump after the water supply pump is operated for XX seconds.

As described with reference to FIG. 9, when the operator utters a voice including the second word KW2 so as to be input to the microphone 511, the second instruction information CM2 corresponding to a plurality of consecutive operations can be output to the analyzer main body 6A. Therefore, even when the operator is at a position away from the analyzer main body 6A (the operation panel 51), the operator can easily instruct a plurality of consecutive operations to the analyzer main body 6A. Therefore, workability of the operator can be improved.

FIG. 10 is a table illustrating an example of a relationship between the third word KW3 and the third instruction information CM3.

FIG. 10 illustrates a third table TB23. The third table TB23 is stored in the association storage portion 541 illustrated in FIG. 2.

The third word KW3 is stored in the left column of the third table TB23, and the third instruction information CM3 corresponding to the third word KW3 is stored in the right column of the third table TB23.

For example, when the third word KW3 is "load file number YY", the instruction portion 537 instructs the tester main body 2 to "load a measurement condition file whose file number is YY, set the measurement condition file as the measurement condition, and execute a "measurement mode" operation" as indicated by the third instruction information CM3.

The measurement condition file is stored in the measurement condition storage portion 544 illustrated in FIG. 7. That is, the measurement condition file whose file number is YY is loaded from the measurement condition storage portion 544. The measurement condition file indicates the measurement condition AT.

The "measurement mode" operation indicates switching the tester main body 2 to a start standby state of the measurement operation in the measurement condition AT.

As described with reference to FIG. 10, when the operator utters a voice including the third word KW3 so as to be input to the microphone 511, the third instruction information CM3 for setting the measurement condition AT for the analyzer main body 6A can be output to the analyzer main body 6A. Therefore, even when the operator is at a position away from the analyzer main body 6A (the operation panel 51), the operator can easily set a desired measurement condition AT for the analyzer main body 6A. Therefore, workability of the operator can be improved.

3. Aspects and Effects

It is understood by those skilled in the art that the above-described present embodiments are specific examples of the following aspects.

(Item 1)

A material testing machine according to a first aspect includes a tester main body that executes a material test, an association storage portion that stores a specific word and instruction information to the tester main body in association with each other, a voice receiving portion that receives a voice from a user, an extraction portion that extracts the specific word from the voice by voice recognition processing, a determination portion that determines, with reference to the association storage portion, the instruction information corresponding to the specific word extracted by the extraction portion, and an instruction portion that outputs, to the tester main body, the instruction information determined by the determination portion.

According to the material testing machine described in Item 1, the voice receiving portion receives a voice from a user, and the extraction portion extracts the specific word from the voice by voice recognition processing. Then, the determination portion determines, with reference to the association storage portion, the instruction information corresponding to the specific word extracted by the extraction portion, and the instruction portion outputs the instruction information determined by the determination portion to the tester main body.

Therefore, when the operator utters a voice including the specific word so as to be received by the voice receiving portion, the instruction information corresponding to the specific word can be output to the tester main body. Therefore, even when the operator is at a position away from the tester main body, the operator can easily output the instruction information to the tester main body. As a result, workability of the operator can be improved.

In the material testing machine, as a test preparation operation, the operator may set heavy objects such as the upper gripper and the lower gripper in the tester main body. In such a case, even when the operator is at a position away from the tester main body during the test preparation operation, the operator can easily output the instruction information to the tester main body. Therefore, the safety of the operator can be improved.

(Item 2)

In the material testing machine according to Item 1, the instruction information includes first instruction information corresponding to one operation of the tester main body, and the association storage portion stores, in association with the first instruction information, a first word that is the specific word corresponding to the first instruction information.

According to the material testing machine described in Item 2, the instruction information includes first instruction information corresponding to one operation of the tester main body, and the association storage portion stores, in association with the first instruction information, a first word that is the specific word corresponding to the first instruction information.

Therefore, when the operator utters a voice including the first word stored in the association storage portion in association with the first instruction information so as to be received by the voice receiving portion, the first instruction information corresponding to one operation can be output to the tester main body. Therefore, even when the operator is at a position away from the tester main body, the operator can easily instruct one operation to the tester main body. As a result, workability of the operator can be improved.

(Item 3)

In the material testing machine according to Item 1 or 2, the instruction information includes second instruction information corresponding to a plurality of consecutive operations of the tester main body, and the association storage portion stores, in association with the second instruction information, a second word that is the specific word corresponding to the second instruction information.

According to the material testing machine described in Item 3, the instruction information includes second instruction information corresponding to a plurality of consecutive operations of the tester main body, and the association storage portion stores, in association with the second instruction information, a second word that is the specific word corresponding to the second instruction information.

Therefore, when the operator utters a voice including the second word stored in the association storage portion in association with the second instruction information so as to be received by the voice receiving portion, the second instruction information corresponding to a plurality of consecutive operations can be output to the tester main body. Therefore, even when the operator is at a position away from the tester main body, the operator can easily instruct a plurality of consecutive operations to the tester main body. As a result, workability of the operator can be improved.
(Item 4)

In the material testing machine according to any one of Items 1 to 3, the instruction information includes third instruction information for setting a test condition for the tester main body, and the association storage portion stores, in association with the third instruction information, a third word that is the specific word corresponding to the third instruction information.

According to the material testing machine described in Item 4, the instruction information includes third instruction information for setting a test condition for the tester main body, and the association storage portion stores, in association with the third instruction information, a third word that is the specific word corresponding to the third instruction information.

Therefore, when the operator utters a voice including the third word so as to be received by the voice receiving portion, the third instruction information for setting the test condition for the tester main body can be output to the tester main body. Therefore, even when the operator is at a position away from the tester main body, the operator can easily set a desired test condition for the tester main body. As a result, workability of the operator can be improved.
(Item 5)

A particle analyzing apparatus according to a second aspect includes an analyzer main body that generates a sample image of a liquid sample in which particles are dispersed, an association storage portion that stores a specific word and instruction information to the analyzer main body in association with each other, a voice receiving portion that receives a voice from a user, an extraction portion that extracts the specific word from the voice by voice recognition processing, a determination portion that determines, with reference to the association storage portion, the instruction information corresponding to the specific word extracted by the extraction portion, and an instruction portion that outputs, to the analyzer main body, the instruction information determined by the determination portion.

According to the particle analyzing apparatus described in Item 5, the voice receiving portion receives a voice from a user, and the extraction portion extracts the specific word from the voice by voice recognition processing. Then, the determination portion determines, with reference to the association storage portion, the instruction information corresponding to the specific word extracted by the extraction portion, and the instruction portion outputs the instruction information determined by the determination portion to the analyzer main body.

Therefore, when the operator utters a voice including the specific word so as to be received by the voice receiving portion, the instruction information corresponding to the specific word can be output to the analyzer main body. Therefore, even when the operator is at a position away from the analyzer main body, the operator can easily output the instruction information to the analyzer main body. As a result, workability of the operator can be improved.
(Item 6)

In the particle analyzing apparatus according to Item 5, the instruction information includes first instruction information corresponding to one operation of the analyzer main body, and the association storage portion stores, in association with the first instruction information, a first word that is the specific word corresponding to the first instruction information.

In the particle analyzing apparatus according to Item 6, the instruction information includes first instruction information corresponding to one operation of the analyzer main body, and the association storage portion stores, in association with the first instruction information, a first word that is the specific word corresponding to the first instruction information.

Therefore, when the operator utters a voice including the first word stored in the association storage portion in association with the first instruction information so as to be received by the voice receiving portion, the first instruction information corresponding to one operation can be output to the analyzer main body. Therefore, even when the operator is at a position away from the analyzer main body, the operator can easily instruct one operation to the analyzer main body. As a result, workability of the operator can be improved.
(Item 7)

In the particle analyzing apparatus according to Item 5 or 6, the instruction information includes second instruction information corresponding to a plurality of consecutive operations of the analyzer main body, and the association storage portion stores, in association with the second instruction information, a second word that is the specific word corresponding to the second instruction information.

According to the particle analyzing apparatus described in Item 7, the instruction information includes second instruction information corresponding to a plurality of consecutive operations of the analyzer main body, and the association storage portion stores, in association with the second instruction information, a second word that is the specific word corresponding to the second instruction information.

Therefore, when the operator utters a voice including the second word stored in the association storage portion in association with the second instruction information so as to be received by the voice receiving portion, the second instruction information corresponding to a plurality of consecutive operations can be output to the analyzer main body. Therefore, even when the operator is at a position away from the analyzer main body, the operator can easily instruct a plurality of consecutive operations to the analyzer main body. As a result, workability of the operator can be improved.
(Item 8)

In the particle analyzing apparatus according to any one of Items 5 to 7, the instruction information includes third instruction information for setting a test condition for the analyzer main body, and the association storage portion stores, in association with the third instruction information, a third word that is the specific word corresponding to the third instruction information.

According to the particle analyzing apparatus described in Item 8, the instruction information includes third instruction information for setting a test condition for the analyzer main body, and the association storage portion stores, in association with the third instruction information, a third word that is the specific word corresponding to the third instruction information.

When the operator utters a voice including the third word so as to be received by the voice receiving portion, the third instruction information for setting the measurement condition for the analyzer main body can be output to the analyzer main body. Therefore, even when the operator is at a position away from the analyzer main body, the operator can easily set a desired measurement condition for the analyzer main body. As a result, workability of the operator can be improved.

4. Other Embodiments

The tensile tester 1 according to the first embodiment is merely an example of an aspect of the material testing machine according to the present invention, and can be arbitrarily modified and applied without departing from the gist of the present invention. In addition, the particle analyzing apparatus 6 according to the second embodiment is merely an example of an aspect of the analyzing apparatus according to the present invention, and can be arbitrarily modified and applied without departing from the gist of the present invention.

For example, in the first embodiment, a case where the material testing machine is the tensile tester 1 has been described, but the present invention is not limited thereto. It suffices as long as a material testing machine applies a test force to the test piece TP and deforms the test piece TP to perform a material test. For example, the material testing machine may be a compression testing machine, a bending testing machine, or a torsion testing machine.

In addition, a case where the particle analyzing apparatus 6 analyzes an image of the particle PT of the powder sample SP by, for example, a dynamic image analysis method defined in JIS Z8827-2 has been described in the second embodiment, but the present invention is not limited thereto. It suffices as long as the particle analyzing apparatus 6 generates a sample image PS of the liquid sample SL in which the particles PT are dispersed. In other words, the analysis of the image of the particle PT using the sample image PS may be performed by an apparatus different from the particle analyzing apparatus 6.

In the present embodiment, a case where the instruction information CM includes the first instruction information CM1, the second instruction information CM2, and the third instruction information CM3 has been described, but the present invention is not limited thereto. It suffices as long as the instruction information CM includes at least one of the first instruction information CM1, the second instruction information CM2, and the third instruction information CM3.

In addition, each functional unit illustrated in FIGS. 1, 2, and 7 represents a functional element, and a specific implementation form is not particularly limited. That is, hardware individually corresponding to each functional unit does not necessarily need to be mounted, and it is of course possible to have a configuration in which functions of a plurality of functional units are realized by one processor executing a program. In addition, some of the functions implemented by software in the above embodiments may be implemented by hardware, or some of the functions implemented by hardware may be implemented by software.

Furthermore, the flowchart illustrated in FIG. 6 is divided into processing units according to main processing contents in order to facilitate understanding of the processing of the control portion 52. The present invention should not be limited by the way or name by which the flowchart of FIG. 6 is divided into the processing units. That is, depending on the content of the processing, the flowchart may be divided into more processing units or may be divided such that each processing unit includes more processing. In addition, the processing order of the above flowchart is not limited to the illustrated example.

Furthermore, as described with reference to FIGS. 2 and 7, in the present embodiment, the processor 53 included in the control portion 52 is caused to execute the control program stored in the memory 54 or the storage device. This control program can also be recorded in a computer-readable recording medium. As the recording medium, a magnetic or optical recording medium or a semiconductor memory device can be used.

Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium.

Furthermore, the recording medium may be a non-volatile storage device such as a RAM, a ROM, or an HDD which is an internal storage device included in the control portion 52. In addition, the control program may be stored in a server device or the like, and the control program may be downloaded from the server device to the control portion 52.

What is claimed is:

1. A material testing machine comprising:
a tester main body that executes a material test;
a memory that stores at least one of a plurality of sequences indicating a plurality of consecutive operations of the tester main body and a plurality of test conditions to be executed by the tester main body in association with identification information; and
a processor configured to:
receive a voice from a user;
extract a specific word from the voice by voice recognition processing and extract the identification information from the specific word; and
read out, from the memory, at least one of a sequence corresponding to the identification information extracted and a test condition corresponding to the identification information extracted, and output the read out to the tester main body.

2. A particle analyzing apparatus comprising:
an analyzer main body that generates a sample image of a liquid sample in which particles are dispersed;
a memory that stores at least one of a plurality of sequences indicating a plurality of consecutive operations of the analyzer main body and a plurality of test conditions to be executed by the analyzer main body in association with identification information; and
a processor configured to:
receive a voice from a user;
extract a specific word from the voice by voice recognition processing and extract the identification information from the specific word; and
read out, from the memory, at least one of a sequence corresponding to the identification information extracted and a test condition corresponding to the identification information extracted, and output the read out to the analyzer main body.

\* \* \* \* \*